Dec. 24, 1940.  D. L. BABCOCK  2,226,152
BRAKE MECHANISM
Filed May 18, 1937

David L. Babcock
INVENTOR.

BY Newton M. Perrins,
Donald H. Stewart,
ATTORNEYS

Patented Dec. 24, 1940

2,226,152

UNITED STATES PATENT OFFICE 2,226,152

BRAKE MECHANISM

David L. Babcock, Rochester, N. Y., assignor to Eastman Kodak Company, Rochester, N. Y., a corporation of New Jersey Application May 18, 1937, Serial No. 143,347

6 Claims. (Cl. 242—55)

The present invention relates to rewinding and/or splicing machines for motion picture film, and more particularly to a brake for controlling and/or arresting the rotation of the supply reel spindle of such a machine. It is contemplated, however, that such a structure is adapted to a wide variety of uses.

An object of the invention is the provision of a foldable brake mechanism for the supply reel spindle on machines of this class. The operating parts of the brake mechanism are so arranged that they may be easily and readily folded when the spindle supporting arm is moved to inoperative position, yet are automatically brought into proper cooperating relation when the supporting arm is moved to reel receiving position.

Another object of the invention is the provision of such mechanism which is simple in construction, inexpensive to manufacture, and positive in its action so as to control or arrest the rotation of the supply spindle.

To these and other ends, the invention resides in certain improvements and combinations of parts all as will be hereinafter more fully described, the novel features being pointed out in the claims at the end of the specification.

In the drawing.

Similar reference numerals throughout the several views indicate the same parts.

Figure 1:
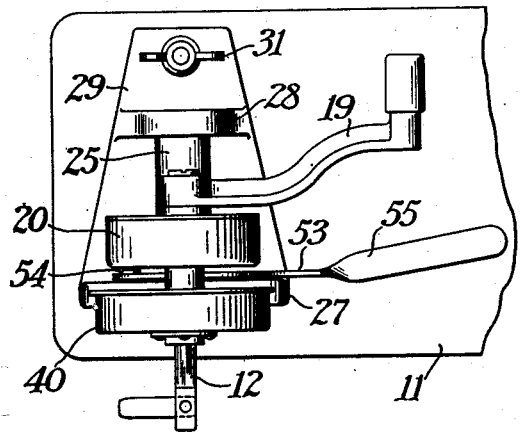
Fig. 1 is a plan view of one end of a rewinding and splicing machine showing a film reel spindle and a brake mechanism therefor constructed in accordance with the preferred embodiment of the invention.

In rewinding or splicing motion picture film, the film strip is unwound from a full reel, designated as the supply reel, and onto an empty reel, designated as the takeup reel. These reels are mounted on reel spindles which are rotatable in suitable supporting arms or posts arranged at opposite ends of the machine. The unwinding is accomplished by driving or rotating the takeup spindle so as to draw the film strip from the supply reel, the supply spindle then running idly in the supporting arm. As the film strip may be fed in either direction, the designation of supply and takeup reels is merely relative, depending on the direction of the movement of the film strip.

It has been found, however, particularly when large reels of film are being rewound, that the momentum of the supply reel will often cause this reel to overrun and thus unwind the film strip at a faster rate than it is being wound onto the takeup reel. The disadvantages of such overrunning are obvious to those in the art.

In order to overcome this difficulty, the present invention provides a brake mechanism which may be utilized to positively control the rate of rotation of the supply reel, or may actually stop such rotation when desired, as for example, when the film is being viewed or spliced. Such a brake not only maintains a uniform tension on the film strip, thus affording tightly wound reels, but also prevents the undesirable overrunning of the film from the supply reel. Furthermore, such a brake is particularly designed and adapted to be used with the types of rewinding and splicing machines which are provided with foldable or collapsible reel supporting arms. The brake operating members are so constructed and arranged that they may be readily and easily folded or collapsed as a unit with the spindle supporting arm, yet when the arm is moved into operating position, these members are automatically movable to the proper cooperating relation to operate and control the brake.

Referring now to the drawing wherein is shown a portion of the rewinding and splicing machine having a base 11 on the opposite end of which the reel spindles, hereinafter described, are suitably mounted. As the constructions of the reel spindle supporting arms at the opposite ends of the machine are identical, only one of these will be herein described.

Each spindle 12 is rotatably mounted on the upper end 13 of an L-shaped post or arm, 14. The spindle extends through a tubular sleeve portion 15 of the arm and has mounted thereon a gear 16 which meshes with a cooperating gear 17 rotatably mounted on the shaft 18 to which an operating handle 19 is secured. When the handle 19 is rotated, the spindle 12 will be driven or rotated as is apparent from the inspection of Fig. 3. A suitable one-way clutch, not shown, may be provided between the handle 19 and the gear 17 so that when the spindle 12 supports or carries the supply reel, the handle will not rotate when the spindle is rotated by the unwinding of the film from the supply reel. The gears 16 or 17 are preferably housed in a U-shaped gear casing 20 which is formed in the upper end of the arm 14, and closed by a suitable cover plate 21 which is secured to the arm 14 by means of screws 22, as clearly shown in Fig. 3.

The lower cylindrical end 25 of the L-shaped arm 14 is pivotally mounted on a shaft 26 which is supported at its ends in spaced vertical bearings 27 and 28 of a bracket 29. This bracket may be rigidly secured to the base 11, but is preferably pivotally mounted thereon so that the bracket and arm 14 may be moved relative to the base so that the reels may be brought into proper alignment with each other or with a splicer or viewing device, not shown.

Figure 4:
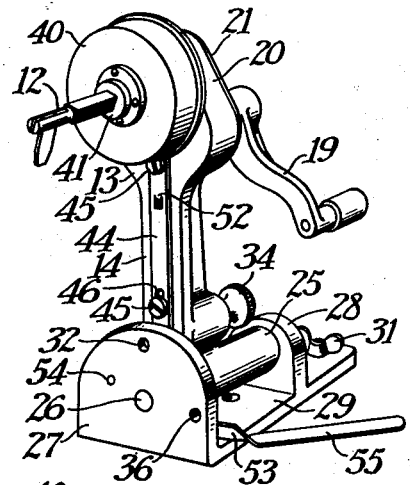
Fig. 4 is a perspective view of the arrangement illustrated in Fig. 2, but detached from the base of the machine, to more clearly show the brake mechanism.
Figure 2:
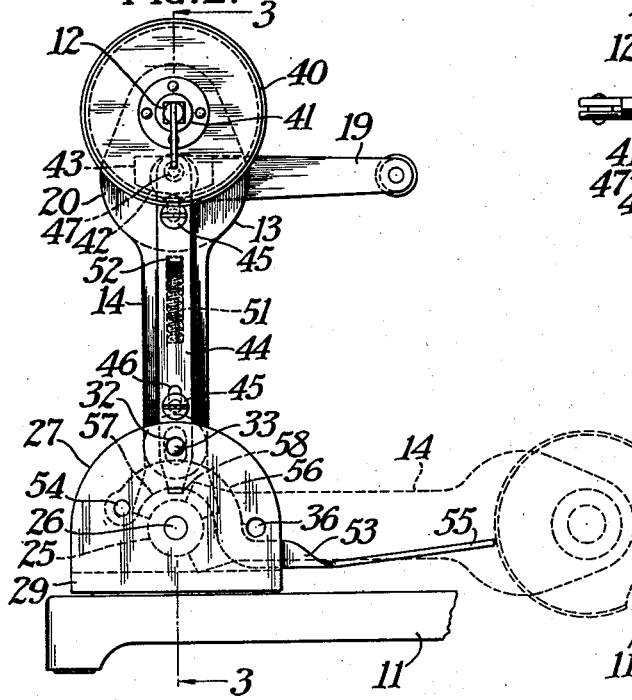
Fig. 2 is an elevation view of the portion of the machine illustrated in Fig. 1.
Figure 3:
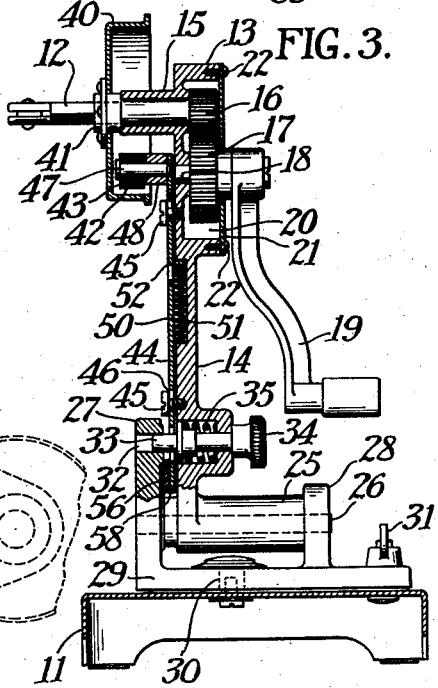
Fig. 3 is a vertical sectional view taken substantially on the line 3—3 of Fig. 2.

To this end, a screw 30 extends through the base 11 and the bracket 29, as clearly shown in Fig. 3, to pivotally mount the bracket on the base so that the film reels may be pivoted about a vertical axis. A wing nut 31 locks the bracket in adjusting position. The bearing 27, preferably of the shape shown in Fig. 2, is provided with an aperture 32 into which the end 33 of a spring pressed pin or plunger 34, of well known construction, is arranged to project to secure the arm 14 in vertical or reel receiving position, as shown in Figs. 2, 3 and 4.

When the machine is not in use, the reel supporting arm 14 is preferably folded or collapsed substantially into the plane of the base 11, as shown in the dotted line in Fig. 2. To thus fold the arm 14, the pin 34 is retracted against the action of the spring 35, until the end 33 thereof is withdrawn from the opening 32. The arm 14 is then pivoted on the shaft 26 until it reaches the position shown in dotted lines in Fig. 2. At this point, the pin 34 then registers with a second opening 36 in the bearing 27. Upon release of the pin, the end 33 will then snap into the opening 36 to lock the arm in folded or collapsed position on the base, thus providing a compact structure suitable for storing or shipping. When, however, the machine is in use, the pin 34 is withdrawn from the opening 36, the reel arm 14 is swung about the shaft 26 until the arm is in vertical or reel receiving position. Then upon release of the pin 34, the end 33 thereof snaps into the opening 32 to securely lock the arm in erect position, as shown in Figs. 3 and 4.

As the arm 14 supports the film reel spindle 12, and the base 11 in turn supports the arm 14, these members may be broadly considered as a two-piece foldable or collapsible support for the reel spindle. This particular arrangement, however, by which the arm 14 can be folded relative to the base 11 may be varied and does not constitute a part of the present invention.

In order to prevent overrunning of the supply reel, and to maintain a slight tension on the film strip as it is being wound onto the take-up reel, the present invention provides means for supplying a drag on the supply reel spindle so that the rotation thereof may be controlled, or may be actually stopped for viewing or splicing. The amount of drag which is applied to the supply spindle, of course, varies depending on the amount of film carried by the supply reel, as is apparent to those in the art. By means of such an arrangement overrunning of the supply reel is prevented, and tightly wound take-up reels are assured.

Referring now to the drawing, and particularly to Fig. 3 wherein is shown a cup-shaped brake drum 40 secured, in any suitable and well known manner, to a sleeve 41 mounted on and rotatable as a unit with the spindle 12. This drum is concentric with the spindle, and has the inner surface thereof formed to provide a braking surface against which the arcuate face 42 of a fiber brake shoe 43 may frictionally engage. When the face 42 is brought into contact with the drum, as is hereinafter described, the speed of rotation of the spindle 12 may be controlled or arrested, as is well known.

A flat metal strip or member 44 is slidably secured to the side of the arm 14 by means of screws 45 which extend through elongated slots 46 in the strip and into threaded openings formed in the arm 14. The screws 45 engage the ends of the slot 46 and thus limit the movement of the strip 44. A pin 47 projects laterally from the upper end of the strip 44 and carries the brake shoe 43. A suitable filler sleeve 48, preferably metal, is interposed between the shoe 43 and the strip 44 to properly position the shoe relative to the drum 40. The shoe is preferably mounted on the pin 47 so that it is free to oscillate thereon so that it may adjust itself relative to the inner surface of the drum 40.

A coil spring 50 is positioned in a slot 51 formed in the arm 14, and is held in position therein by the strip 44, see Fig. 3. An upset ear or lug 52 is formed from the strip 44, and extends into the slot 51 and into engagement with the spring 50, all of which is clearly illustrated in Fig. 3. It is apparent from the above description, that when the strip 44 is moved downwardly, in a manner to be presently described, the face 42 of the shoe 43 may be brought into frictional engagement with the drum 40, the amount of braking support, of course, depending on the amount of movement of the strip 44. This downward movement of the strip 44 causes the lug or ear 52 to compress the spring 50. When, however, the strip 44 is released, the spring 50 will automatically return the members to the position shown in Fig. 3 to move the shoe 43 out of engagement with the brake drum 40.

In the preferred embodiment of the invention, the strip 44 is moved downwardly by means of a lever 53, one end of which is pivotally mounted on a pin 54 secured to the bearing member 27, as shown in Fig. 2. The free end of the lever 53 is formed with a flat portion 55 adapted to be operated by the hand to pivot the lever 53 about its pivot point 54. The end of the lever adjacent the pin 54 is, however, bent or formed to provide an arcuate portion 56 the under edge or surface 57 of which overrides and engages a laterally extending lug 58 turned up from the lower end of the strip 44, as shown in Fig. 3. Thus, when the end 55 of the lever 53 is depressed, the lever will pivot about the pin 54 to bring the lower edge 57 of the lever into engagement with the lug 58. Further depression of the lever will cause the strip 44 and the brake shoe 43 to move downwardly as above described. When, however, the lever 53 is released, the spring 50 will carry the strip 44, and by reason of the lug 58, also the lever 53 upwardly to move the shoe 43 out of contact with the brake drum 40 and into the position shown in Fig. 3.

Referring now to Fig. 2, it is clearly seen that the lower surface or edge 57 of the arcuate portion 56 is concentric with the shaft 26 about which the arm 14 pivots when the arm is moved to collapsed or folded position, as shown in dotted lines, Fig. 2 and above described. Thus, when the arm 14 is collapsed or folded into the plane of the base 11, the lug 58 on the member 44 will move about the shaft 26 as a center, and will slide along the concentric surface 57 of the lever 53 so that when the brake arm is collapsed, the strip 44 and brake shoe 43 will be in the same relative position as when the arm 14 is in erected position, but will be substantially in the plane of the lever 53. By means of this arrangement, the strip 44 and the lever 53, which constitute the mechanism for operating the brake, may be readily folded substantially into the plane of the base 11 when the arm 14 is folded. However, as the arm 14 pivots on the bracket 29, the latter forms, in effect, a part of the base 11 so that the lever 53 may be considered as being pivotally mounted on the base.

It is thus apparent from the above description that the present invention provides a new and novel brake for controlling or arresting the rotation of the supply reel spindle to prevent overrunning thereof. It is also apparent that the brake operating mechanisms or levers are so arranged and constructed that they may be easily folded upon the folding of the spindle supply arm, yet are automatically brought into proper cooperating relation when the arm is moved to regular reel receiving position.

While only one embodiment of the invention has been disclosed, it is to be understood that the inventive idea may be carried out in a number of ways. This application is, therefore, not to be limited to the precise details described, but is intended to cover all variations and modifications thereof falling within the spirit of the invention or the scope of the appended claims.

I claim:

1. In a film winding device, the combination with a rotatable reel spindle, a supporting arm for said spindle, a base on which said arm is pivotally mounted whereby said arm may be folded substantially into the plane of said base, of a brake mechanism for said spindle comprising a member slidably mounted on said arm and movable therewith, and an operating member pivoted on said base adjacent the pivot point of said arm and engaging said member to move the latter to operate said brake.

2. In a film winding device, the combination with a rotatable reel spindle, a supporting arm for said spindle, a base on which said arm is pivotally mounted whereby said arm may be folded substantially into the plane of said base, of a foldable brake mechanism comprising a brake drum mounted on and rotatable with said spindle, a slidable member mounted on and foldable with said arm, a brake shoe operatively connected to one end of said member and arranged to engage said drum to apply a braking force to said spindle, and an arcuate lever pivotally mounted on said base adjacent the pivot point of said arm and engaging said member to move said shoe into frictional engagement with said drum, said lever permitting the member and lever to be collapsed substantially into the plane of said base.

3. In a film winding device, the combination with a rotatable reel spindle, a supporting arm for said spindle, a base on which said arm is pivotally mounted whereby said arm may be folded substantially into a plane of said base, of a foldable brake mechanism comprising a brake drum mounted on said spindle, a slidable member mounted on and foldable with said arm, a brake shoe operatively connected to one end of said member and arranged to engage said drum, an arcuate lever pivotally mounted on said base adjacent the pivot point of said arm and engaging said member to move said shoe into frictional engagement with said drum, said lever permitting the member and lever to be collapsed substantially into the plane of said base, and resilient means secured to said member and tending to move the latter to disengage said shoe from said drum.

4. In a film winding device, the combination with a rotatable reel spindle, a base, a spindle supporting arm pivotally mounted on said base and adapted to project upwardly therefrom in reel receiving position or to be folded substantially into the plane of said base, of a foldable brake mechanism comprising a brake drum on said spindle, a slidable member mounted on and foldable with said arm, a brake shoe pivotally connected to the upper end of said member and adapted to engage said drum, a hand lever pivoted at one end thereof to said base, an arcuate section on said lever engaging the lower end of said member to move the latter downward upon depressing said lever to bring said shoe into frictional engagement with said drum, and a spring secured to said member to move the member and said lever upwardly upon releasing said lever to move said shoe out of engagement with said drum.

5. In a film winding device, the combination with a rotatable reel spindle, of a collapsible support for said spindle, comprising a pair of angularly arranged members which are pivotally connected together so as to be movable relative to each other and collapsible substantially into a plane, and a foldable brake mechanism comprising cooperating elements carried by and movable with said members and foldably connected together adjacent the pivot of said members.

6. In a film winding device, the combination with a rotatable reel spindle, of a collapsible support for said spindle comprising a pair of angularly arranged members which are pivotally connected together so as to be movable relative to each other and collapsible substantially into a plane, a foldable brake mechanism comprising cooperating elements carried by and movable with said members, a slidable connection for said elements positioned adjacent to and concentric with the pivot of said members, and means for locking said members in the angular and collapsed positions.

DAVID L. BABCOCK.